Dec. 30, 1924.
H. R. DAVIES
1,521,584
BATTERY CHARGING AND DISCHARGING SYSTEM
Filed April 8, 1919
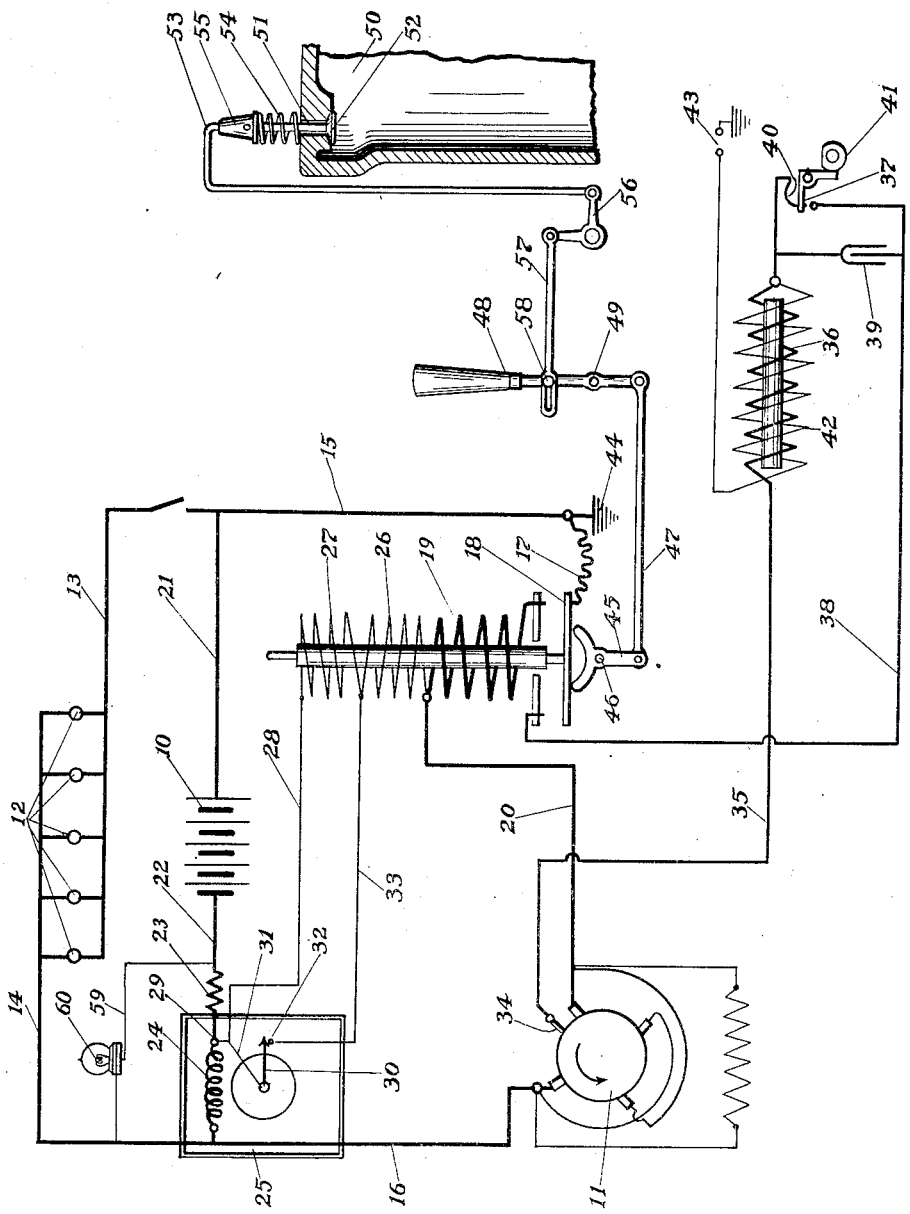
*INVENTOR.*
*Henry R. Davies*
BY *Chester H. Braselton*
ATTORNEY Patented Dec. 30, 1924.

1,521,584

UNITED STATES PATENT OFFICE.

HENRY R. DAVIES, OF TOLEDO, OHIO, ASSIGNOR TO INDUSTRIAL RESEARCH CORPORATION, OF TOLEDO, OHIO, A CORPORATION OF DELAWARE.

BATTERY CHARGING AND DISCHARGING SYSTEM.

Application filed April 8, 1919. Serial No. 288,506.

*To all whom it may concern:*

Be it known that I, HENRY R. DAVIES, a citizen of the United States, residing at Toledo, in the county of Lucas and State of Ohio, have invented certain new and useful Improvements in Battery Charging and Discharging Systems, of which I declare the following to be a full, clear, and exact description.

This invention relates to improvements in battery charging and discharging systems, where the charging means is automatically disconnected after the battery has attained its full capacity by means of mechanism controlled by a current measuring instrument, such as an ampere-hour meter, arranged to be driven in either direction, depending upon the direction of current passing through it.

Storage batteries are not one hundred per cent efficient, in fact the loss in operation approximates twenty five per cent. Hence, if a reversible meter registers correctly the amount of current passing through it on charging until the capacity of the battery is reached, and then upon discharging until the battery is empty, at the end of the operation it will erroneously indicate that the battery is one-fourth full. In order to overcome this difficulty, it is common practice to employ a shunt around the meter with means to automatically increase the resistance of the shunt while the battery is being discharged, thus causing a greater portion of the total current to pass through the meter and correspondingly accelerating its speed during the discharging operation. During the charging operation the resistance of the shunt is decreased and hence it carries a greater part of the current, while the meter receives correspondingly less and registers accordingly. By this means the meter is caused to indicate at all times the state of charge of the battery rather than the amount of current that has passed one way or the other.

The principal object of my invention is the provision of a novel means for accomplishing the above results which is simple and less expensive than means heretofore employed.

Another object is the provision of such means for accomplishing the above objects, as shall have the additional advantage of constituting a signal for indicating to the operator whether the battery is being charged or discharged. This function is of considerable value where the battery circuit includes a motor-dynamo operatively connected to a gas engine, because it is possible that the motor dynamo, after being started, might not be able to start the engine for some one of several reasons, and if the latter was designed to run quietly, the operator would not be apprised of the fact that it was not operating under its own power unless he took the precaution to note the direction of movement of the meter hand. The current consumed by a motor-dynamo, operating as a motor, to revolve the shaft of a gas engine, is comparatively large, and would quickly discharge the battery and even do it great damage if permitted to continue. In my invention however, the meter regulating means includes a pilot lamp which glows more brightly while the heavy starting current is flowing than while the battery is being charged, and hence the operator is apprised of this condition by a signal that he can not well avoid noticing.

A still further object is the provision of means, including a lamp, such as that above indicated, which at the same time may be employed for lighting up any desired object such, for instance, as the face of the meter dial.

Other objects, and objects relating to details of construction and economies of manufacture, will appear as I proceed with the description of that embodiment of my invention which, for the purposes of the present application, I have illustrated in the accompanying drawing, which is a diagram of apparatus and electrical connections embodying my invention.

In the drawing, 10 indicates the storage battery which is floated across the line between a dynamo-electric machine 11 and a load indicated as a bank of lamps 12. The lamps are connected by wires 13 and 14 with conductors 15 and 16, the latter one of which leads directly to the motor-dynamo 11. The conductor 15 has connected therewith a flexible wire 17, attached at its other end to an armature 18 of an electro-magnet. This armature, when raised, makes contact with one end of a coil 19 of the magnet, the other end being connected to a conductor 20 leading to the motor dynamo. The battery 10 is bridged across the conductors 15, 16 by a connecting wire 21 and a connecting wire 22, which includes a resistance coil 23 and the internal circuits indicated at 24 of a reversible integrating current meter 25, preferably an ampere-hour meter.

In addition to the series coil 19, the electro-magnet is provided with two coils 26 and 27, which are oppositely wound and arranged in series, the magnetism induced by the coils 19 and 27 being cumulative and opposed by that of the coil 26. The free extremity of the coil 27 is connected by a wire 28 with one terminal 29 of the meter. The terminal 29 is also connected with the meter hand 30 by a wire 31. A contact point 32 is mounted in the meter dial in a position to be engaged by the hand 30, when the latter registers "full" and thus wire 28 and coil 27 are short circuited through wire 33, which is connected to the point of juncture of the two coils 26 and 27.

Ignition current for the gas engine to which the dynamo-electric machine is operatively connected, is taken off the third brush 34 of the motor-dynamo 11 through a circuit wire 35 to the primary winding 36 of an ignition coil and thence through the timer 37, circuit wire 38, armature 18, coil 19 and wire 20 back to the motor-dynamo. A condenser 39 is connected across this circuit to reduce sparking, as will be well understood by those skilled in the art. In the timer illustrated, the spring 40 for pressing the contact lever against the actuating cam 41 is a part of the primary circuit. The secondary winding 42 of the ignition coil is connected on one side to the spark plug, diagrammatically indicated at 43, and thence to the ground, and on the other side through spring 40, circuit wire 38, armature 18, and flexible conductor 17 to ground at 44.

In my system, the making of the electrical connection between the battery and motor-dynamo and the completion of the ignition circuit are accomplished by manually raising the armature 18, by means of a Y-shaped lever 45 pivoted at 46. The lever 45 is arranged to be rocked in either direction about its pivot point 46 by means of a link 47, pivoted at one end to the bottom of the Y lever 45, and at the other end to the bottom of a control lever 48, which is mounted to swing on a pivot 49.

In order to lessen the load put upon the motor-dynamo when functioning as a motor to start the engine, I provide mechanism for relieving the compression in the engine cylinder until the motor has sufficient time to pick up speed. In the drawing, a fragment of the engine cylinder is shown at 50. It is provided with a small port 51, adapted to be closed by a valve 52, mounted upon a rod 53 extending upward for a distance and then downward alongside the cylinder wall. The valve is normally held to its seat by means of a spring 54 bearing at its respective ends against the cylinder and against a stop 55 secured to the rod 53. The lower extremity of the rod 53 is pivotally connected with one arm of a bell crank lever 56, the other arm of which is pivoted to a link 57, which has a pin and slot connection 58 with the control lever 48.

The operation of my invention thus far described is as follows: It being assumed that the hand 30 of the meter 25 shows that the battery is nearly discharged, and the operator wishing to recharge it, the control lever 48 is thrown to the right. This accomplishes the opening of relief valve 52 through the mechanism above described, as will be readily understood. It also swings the lower end of the Y lever 45 to the left, thereby causing one prong of the latter lever to elevate the armature 18, until it makes contact with the adjacent end of the wire 38 and the coil 19, thereby completing a circuit from the battery 10 through wires 21, 15, 17, 19 and 20 to the motor-dynamo, and from the latter through wire 16 to the meter 25, through the internal circuits 24 thereof, resistance coil 23 and wire 22 back to the battery. At the same time both the primary and secondary ignition circuits are cut in, the primary current passing from the third brush 34 through the circuit wire 35, coil 36, spring 40, timer 37, wire 38, armature 18, coil 19, and wire 20 back to the motor-dynamo, while the secondary current induced in the coil 42 flows through the gap of the spark plug 43 to ground and thence from ground at 44 through wire 17, armature 18 and wire 38 back to coil 42.

As soon as the machine 11, working as a motor, has come up to speed, the control lever 48 is thrown as far as possible in the opposite direction, that is to the left, causing the other prong of the Y-lever to raise the armature 18 and remake the electrical contacts, while at the same time, the valve 51 is permitted to be closed by the spring 54, the loose connection 58 permitting the control lever to move to the left without interference from the compression relieving mechanism. The engine will then begin to fire and will rotate the machine 11 as a dynamo, sending current through the meter 25 into the battery 10. If some of the lamps 12 are burning, the current for this purpose will also be drawn from the dynamo and will pass directly to the lamps without going through the meter 25.

As soon as the engine is running under its own power, and the machine 11 generating current, the operator moves the control lever 48 into neutral position, which is the position shown in the drawing. It will be observed that in this position, the compression relieving mechanism is not affected. The armature 18 is now held in its upper or attracted position by the electro-magnet, the energization of the coils 19 and 27 being sufficient for this purpose in spite of the opposing l'nes of force set up by the coil 26. So long as all three of the coils are energized therefore, the armature 18 will maintain the respective circuits closed, and the battery will continue to be charged. As the charging operation continues the meter hand 30 moves from its initial position towards its "full" position shown in the drawing, and when it reaches the contact 32, which is at the point indicating full charge of the battery, a shunt circuit is completed from terminal 29 through wire 31, meter hand 30, contact 32, and wire 33 to the junction of the two coils 26 and 27, which short circuits coil 27 and also provides a path of less resistance for the current through coil 26. As a consequence, the coil 19 no longer has the assistance of coil 27, and the counteracting effect of coil 26 is heightened slightly. Because of these combined effects the electromagnet is no longer strong enough to hold the armature 18 in elevated position and it falls, breaking the battery dynamo circuit and the ignition circuit, thus stopping the engine.

The system as described up to this point is disclosed and claimed in the co-pending application of Carl P. Brockway, Serial Number 288,570 filed April 8, 1919. The improvement in the present case consists in the addition to the circuits already described, of a shunt circuit 59, extending around the meter 25 and preferably around a resistance coil 23 unless the resistance of the internal circuit 24 of the meter be greater than is ordinarily the case. In the shunt 59 I place a translating device, the resistance of which increases with an increase of current. For this purpose a lamp 60 with a tungsten filament is satisfactory, and is desirable because it has the additional functions stated hereinbefore amongst the objects of the invention.

In the operation of a system embodying my improvement part of the current passing from and to the battery will necessarily go through the shunt 59. During the charging operation the current in the main circuit is comparatively low, say 10 amperes, for example. The combined resistance of coil 23 and circuits 24 being quite small, the voltage drop around these elements for this small current will be correspondingly small, and will be insufficient to cause the lamp to heat up much or glow brightly. Consequently the resistance of the lamp will not be reduced. When however, the machine 11 operates as a motor to start the engine, it uses a large current, say 150 amperes, and the voltage drop between the terminals of the shunt 59 is correspondingly large. This larger voltage causes the lamp 60 to heat up and glow brightly. When hot, the resistance of the lamp is considerably increased, hence proportionately less of the total current passes through the shunt upon discharge than on charge, and proportionately more through the meter. Therefore the meter reg'sters a greater part of the whole current passing on discharge than it does on charge and as a smaller total quantity of current passes on discharge than on change due to energy losses in the battery resulting from conversion of electrical energy into chemical energy and back again into electrical energy, the meter is thus enabled to indicate correctly the state of charge of the battery.

While the compensating means of this invention is satisfactory where the greater part of the work done by the battery is the starting of the gas engine or other work which calls for a heavy current, it should be noted that this compensating means alone will not make a sufficient correction where the greater part of the load is a small lamp circuit or other load calling for a comparatively small current. For such purposes some other compensating means must be employed in addition to my invention. It is a desirable part of the system in all cases, however, because of its added functions of lighting and signaling as heretofore explained. Note should be made that the indicator circuit 59 is permanently connected in the power circuit and therefore the indicator is continuously effective to register any flow of current from the battery to the dynamo electric machine. Also, while the meter hereinabove described is of the electromagnetic coil type, it is obvious that any other type of meter could be utilized in connection with the indicator, the indication and compensation being primarily dependent upon the voltage drop across the meter rather than upon the meter itself.

I am aware that the particular embodiment of my invention above described, and illustrated in the accompanying drawing, is susceptible of considerable variation without departing from the spirit thereof, and therefore I desire to claim my invention broadly as well as specifically, as indicated by the appended claims.

I claim as my invention:

1. In an electrical charging and power system, the combination with a dynamo electric machine operatively connected to a load, of a storage battery adapted to supply current to the dynamo to operate the same as a motor, and to receive current from the dynamo when operated as a generator, a switch for closing the circuit between the battery and dynamo, an electric power indicating meter connected in series between the battery and dynamo, and means connected in parallel with the meter and in series with the battery effective continuously to indicate passage of current from the battery to the dynamo when the switch is closed.

2. In an electric generating system, in combination with a dynamo, a storage battery, and an ampere hour meter interconnected in series, a circuit shunted around said meter and in series with the battery, and a resistance element having a positive temperature coefficient inserted in said shunt circuit, said element being effective to increase the current flow through the meter relative to the shunt circuit when current is passing from the battery to the dynamo, and to diminish the current flow through the meter relative to the shunt circuit when current is passing to the battery.

3. In an electrical charging and power system, the combination of a dynamo electric machine, a storage battery adapted to supply current to operate the dynamo electric machine as a motor, and to receive charging current from the dynamo electric machine as a generator, an electric meter connected in series with the battery and dynamo electric machine, and current indicating means permanently connected in parallel to the meter and in series with the battery, said means being effective as an indicator only when current flows from the battery to operate the dynamo electric machine as a motor.

4. In an electrical system, the combination of a dynamo electric machine, a storage battery interconnected therewith, an electric meter connected to said battery and machine, and a resistance element connected in shunt with the meter, said element having a positive temperature coefficient whereby the ratio of current therethrough to the voltage applied to the meter progressively diminishes with increase of voltage.

5. In an electrical system, the combination of a dynamo electric machine, a storage battery interconnected therewith, an electric meter connected to said battery and machine, and means including a resistance element shunted around said meter, effective, when the voltage across the meter exceeds a set minimum value, simultaneously to increase the normal current flow through the meter and to function as an indicator.

6. In an electrical charging and power system, the combination of a dynamo electric machine, a storage battery adapted to supply current to operate the dynamo electric machine as a motor, and to receive charging current from the dynamo electric machine as a generator, an electric meter connected in series with the battery and dynamo electric machine, and current indicating means connected in parallel to the meter and in series with the battery, adapted to give continuous indication when current flows from the battery to the dynamo electric machine, said means being effective only when current flows in the direction from the battery to the dynamo electric machine.

7. In an electric generating system, in combination with a dynamo, a storage battery and an ampere hour meter interconnected in series, a circuit shunted around said meter and in series with the battery, and a resistance element having a positive temperature coefficient connected in said shunt circuit, said element being effective to increase the current flow through the meter relative to the shunt circuit when current is passing from the battery to the dynamo, and to diminish the current flow through the meter relative to the shunt circuit when current is passing to the battery.

In testimony whereof, I affix my signature.

HENRY R. DAVIES.